Sept. 17, 1968      E. L. MORAGNE      3,401,504
ROTATING BED ABSORBER

Filed May 18, 1967      3 Sheets-Sheet 1

Edward L. Moragne
INVENTOR.

BY Hayden & Pravel
ATTORNEYS

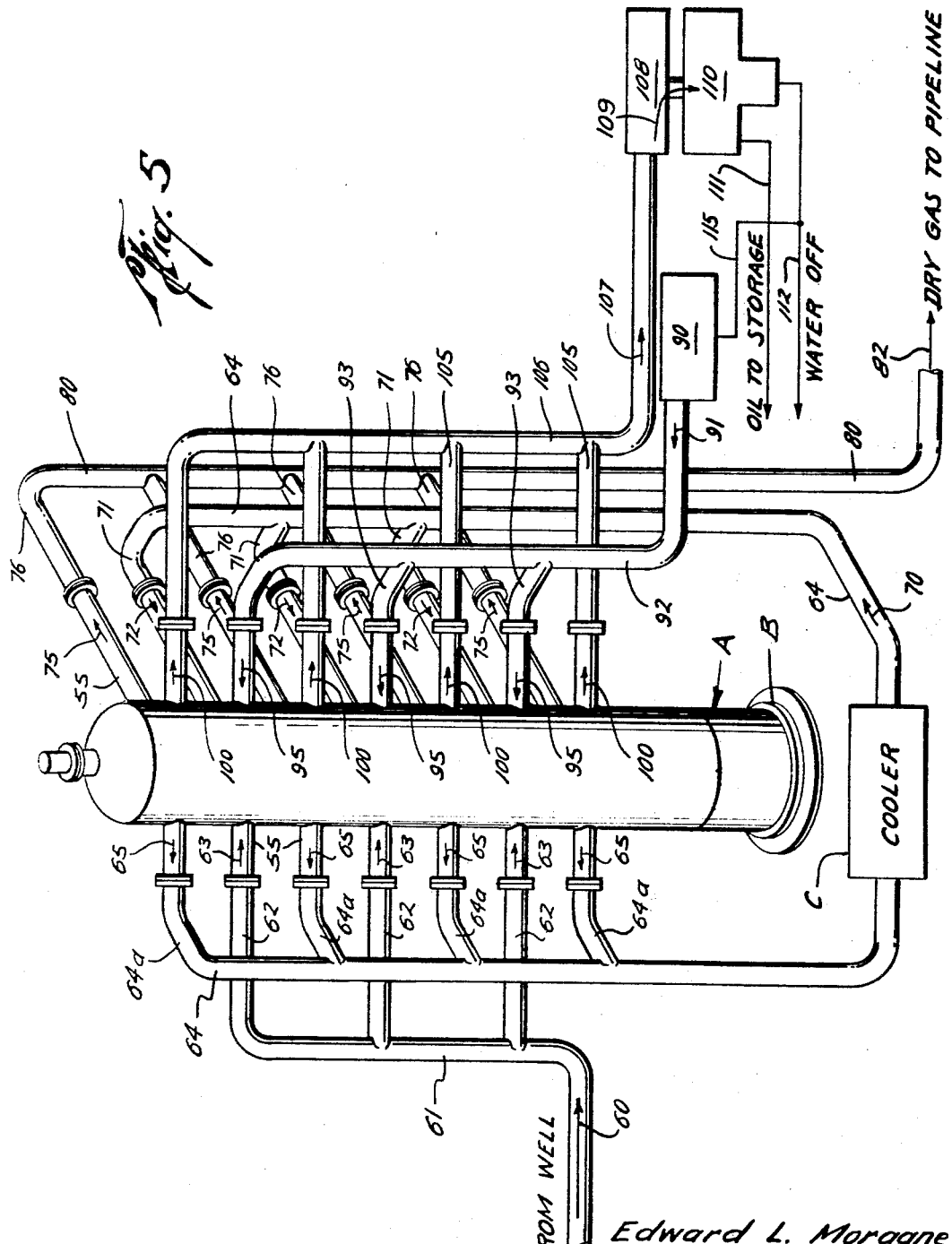

United States Patent Office 3,401,504
Patented Sept. 17, 1968

3,401,504
ROTATING BED ABSORBER
Edward L. Moragne, 4723 Nenana,
Houston, Tex. 77035
Filed May 18, 1967, Ser. No. 639,376
7 Claims. (Cl. 55—179)

ABSTRACT OF THE DISCLOSURE

A vessel having a rotatable shaft positioned therein for receiving a plurality of spaced rotatable discs containing a suitable means for removing a portion of a mixture from the mixture. Positioned between each of the spaced discs is a plurality of baffles for dividing the vessel into a plurality of sections. Some of the sections continuously receive mixtures which are passed through the means for removing and other sections receive a suitable agent for removing the portion of the mixture from the means for removing for continuously regenerating the means for removal.

Background of the invention (1) *Field of the invention.*—This invention relates to an apparatus for continuous removal of a portion of a mixture from the mixture and more particularly to a new and improved apparatus for continuous removal of a portion of a mixture from the mixture.

(2) *Description of the prior art.*—Prior apparatus such as absorbers or filters include a plurality of desiccant beds for absorbing vapors or other type filters and absorbers. Such desiccants or filters become "wet," completely absorbed, or dirty, and the vapors, oil, or other mixture is switched to a dry desiccant bed absorber or clean filter. The wet desiccant absorbed bed or dirty filter is then dried or cleaned to remove absorbed fluids or to clean the absorber or filter therefrom. This step occurs as each subsequent bed or filter becomes absorbed such that wet or dirty desiccant beds or filters cannot be continuously used for removal of a portion of the mixture such as fluids from the vapors. Further, switching from one desiccant bed or filter to another requires a switching of flow of the mixture which necessitates continuous maintenance of the beds and filters.

Also, since prior beds, other absorbers, and filters are not regenerated continuously, the efficiency of the desiccant or filter as means for removal of a portion of the mixture continuously drops so that the means for removal absorbs less and less of the fluids continuously in the vapors and mixture until eventually the means for removal is completely absorbed, wet, dirty, or useless. Of course, such reduction in efficiency, for example, causes the dew point temperature of vapors to vary considerably which variation is undesirable.

Summary of the invention

An apparatus including a hollow vessel having rotating spaced discs containing a means for removing a portion of a mixture positioned therein. A plurality of baffles positioned between the rotary discs enables the mixture to flow continuously through the means for removal and the baffles also enable an agent to be continuously injected through the means for removal for continuous regeneration of the means.

An object of the present invention is to provide a new and improved apparatus for continuously regenerating a means for removal of a portion of a mixture positioned in a plurality of spaced discs.

An object of the invention is to provide a new and improved rotating bed absorber.

Yet another object of the invention is to provide a new and improved rotating bed absorber including a baffle system for enabling a desiccant positioned in a plurality of rotating discs to be continuously dried so that the rotating discs and desiccant positioned therein are continuously in use.

Still yet another object of the invention is to provide a new and improved rotating bed absorber wherein desiccant positioned in a plurality of rotating discs is continuously dried to prevent loss of absorption efficiency of the desiccant whereby the dew point temperature of removed dry vapors remains constant.

Brief description of the drawings

FIG. 3 is a view of one of a plurality of discs which is positioned in a hollow vessel with a rotatable shaft illustrating an outer rim, a plurality of braces and a shaft receiving member;

FIG. 4 is a view, partly in section, of one of a plurality of means for dividing a plurality of compartments in a hollow vessel of the apparatus of the present invention into a plurality of sections; and FIG. 5 is a view of the apparatus of the present invention used as a rotating bed absorber in a system for removing wet vapors from dry vapors such as oil and water.

Description of the preferred embodiments

Figure 1:
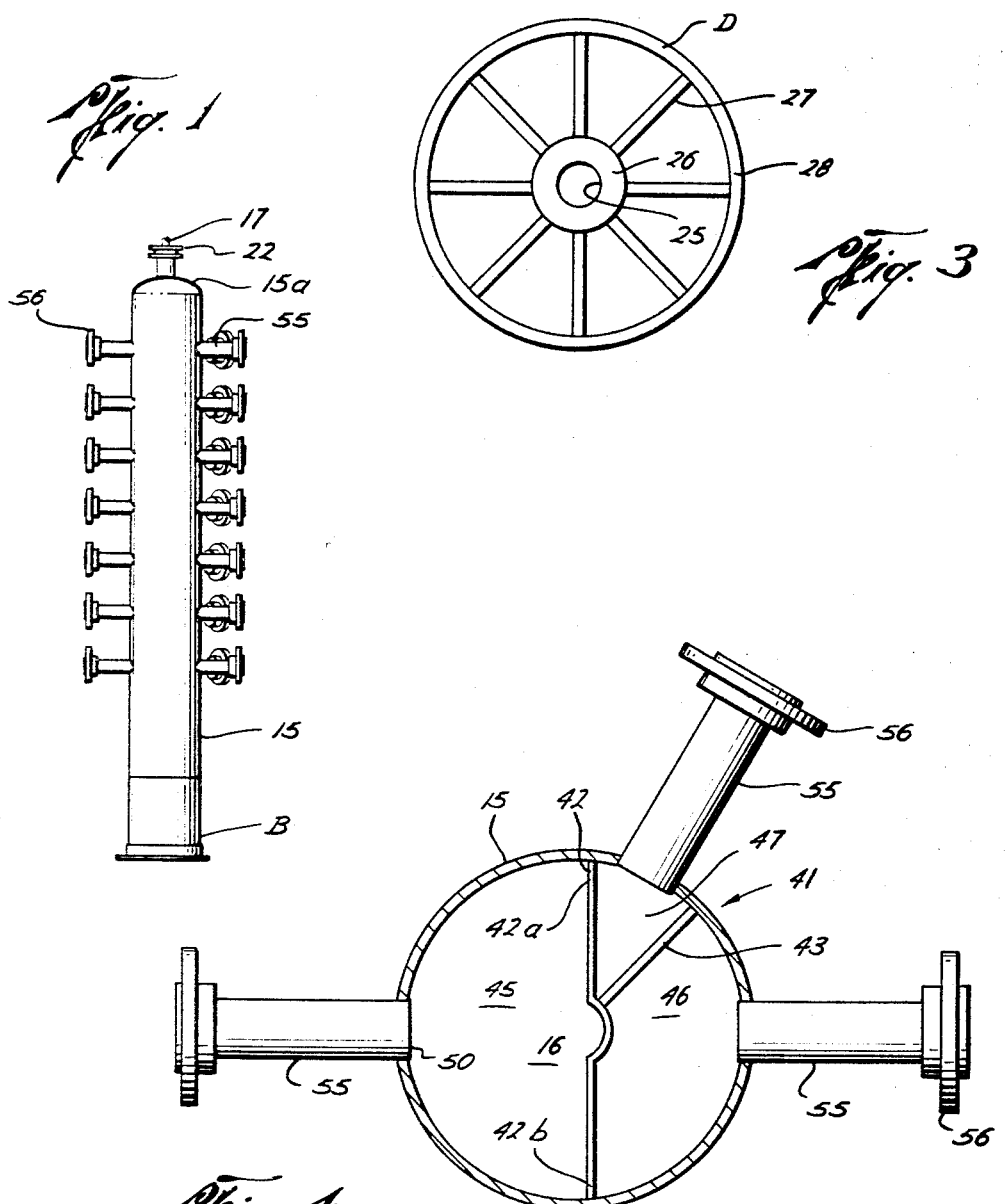
FIG. 1 is an elevation illustrating the apparatus for removing a portion of a mixture of the present invention.
Figure 2:
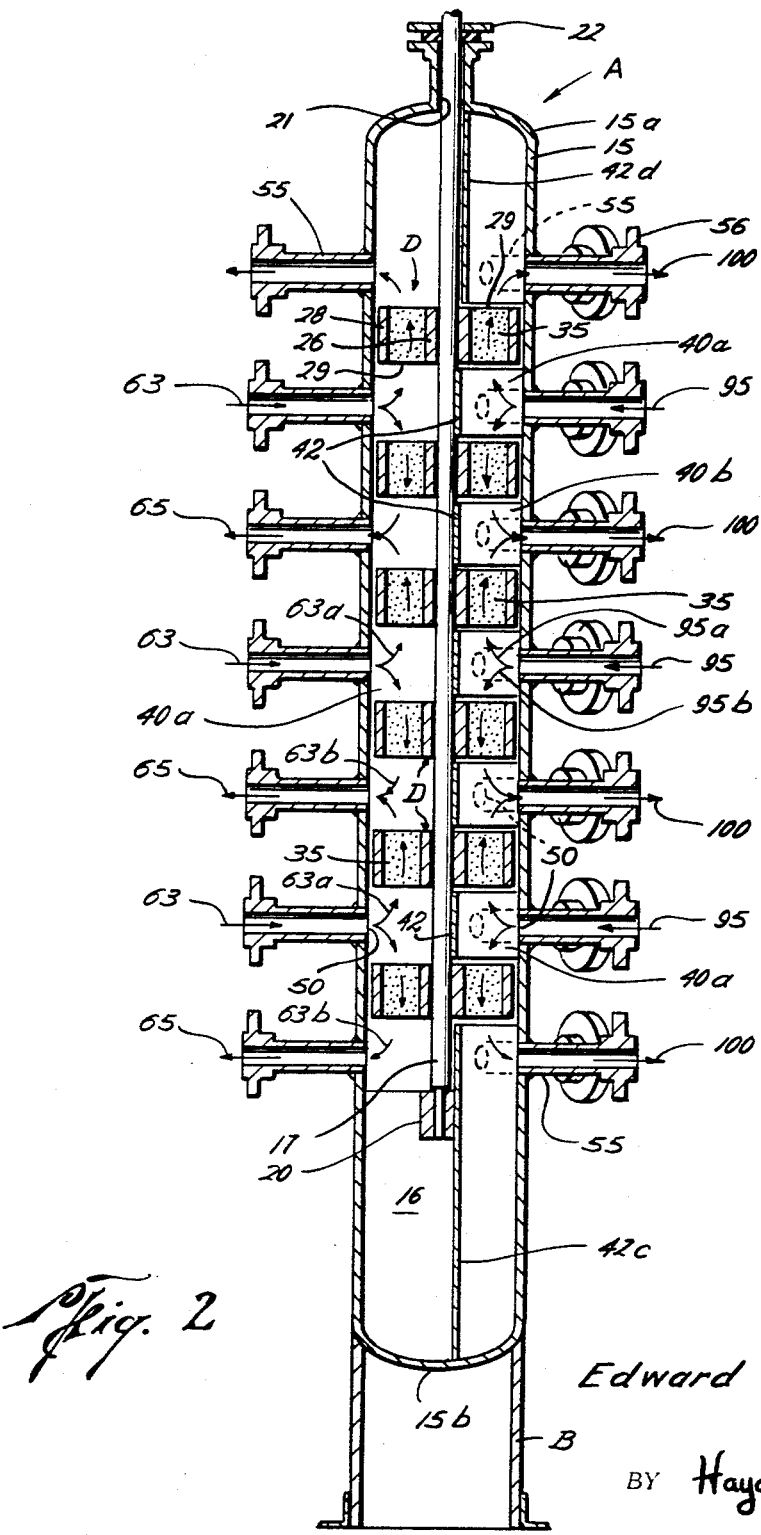
FIG. 2 is a view partly in section and similar to FIG. 1 illustrating the apparatus of the present invention including a plurality of discs positioned and mounted on a rotatable shaft, a plurality of compartments formed between said discs for receiving mixture flow and illustrating the pattern of flow of the mixture through the discs and compartments of the apparatus of the present invention.

Attention is directed to FIGS. 1 and 2 wherein the apparatus of the present invention is generally designated by the letter A. As illustrated in the embodiment the apparatus A is generally positioned vertically relative to the ground; however, it is to be understood that the apparatus may be positioned as desired for use with a plurality of different systems.

The apparatus A of the present invention includes a hollow vessel 15 which is generally constructed of iron, steel, or other suitable materials and includes an upper end 15a and a lower end 15b which are welded to a series of formed sections (not numbered) to form the vessel 15 with the hollow portion being designated at 16. The vessel 15 is supported by a suitable base B mounted with end 15b.

Extending longitudinally in the opening or hollow portion 16 of the vessel 15 is a rotatable shaft 17 which is secured or mouted adjacent the end 15b of the vessel with a bearing and retaining portion 20 for receiving and supporting the shaft 17 in the hollow portion 16. As illustrated in FIG. 2, the shaft 17 extends outwardly through an opening 21 in the end 15a of the vessel 15, and a packing gland and bearing portion 22 is mounted adjacent the opening 21 to extend outwardly therefrom for sealingly engaging the shaft 17. The shaft 17 rotates in the retaining portion 20 and the packing gland and bearing member 22. It is to be understood that the shaft 17 is suitably secured with a motor means (not shown) for rotating the shaft in the vessel 15 as desired.

As illustrated in FIG. 3, a plurality of spaced discs D is mounted with the shaft 17 on the outer surface thereof, and each of the discs includes an opening 25 for receiving the shaft 17. A shaft receiving member 26 is positioned adjacent the shaft 17 and is mounted with a plurality of outwardly extending spaced braces or supports 27. Each of the braces 27 is secured with an inner surface of a circumferential rim member 28 by any suitable means such as welding or by suitable bolt and nut means. As best illustrated in FIG. 2, a pair of spaced cover plates 29 (not illustrated in cross section) having a plurality of openings or holes (not numbered) is mounted with each of the discs D transverse to the shaft receiving members 26 and rim member 28 to enclose or form a compartment 35 for receiving a means for removal of a portion of the mixture (dotted particles), such as, for example, a desiccant for absorption of fluids or a filter. It is, of course, to be understood that rotation of the shaft 17 imparts rotation to each of the discs D in the vessel 15.

A plurality of compartments 40 is formed in the hollow vessel 15 between each of the spaced discs D. Each of the compartments 40 is divided into a plurality of sections by a means generally designated at 41 (FIG. 4). As illustrated in FIG. 4, one of a plurality of first baffle plates 42 includes members 42a and 42b which are suitably secured with opposite sides of the inner surface of the vessel 15 and which are secured in the opening 16 to each other by a semicircular shaft plate portion. The members 42a and 42b are connected to each other by any suitable means such as welding or the like and extend parallel to the shaft 17 such that each end 42c and 42d of the plates 42 is secured by any suitable means such as welding to the ends 15b and 15a, respectively, of the vessel 15 (FIG. 2).

One of a plurality of second baffle plates 43 is secured at one end with the semicircular portion and extends outwardly to be secured by any suitable means such as welding to the inner surface of the vessel 15 (FIG. 4). Thus, the compartments 40 in the hollow vessel 15 are divided into a first section designated as 45, a second section designated as 46, and, if desired, a third section designated as 47. It should also be noted that each of the different sections 45, 46, and 47 which is positioned or formed in each of the compartments 40 is prevented from communicating with each other by the first and second baffle plates 42 and 43. The semicircular portion is positioned adjacent and parallel to the shaft 17, and the plurality of baffle plates 42 and 43 is either welded to their corresponding members in each of the same compartments 40 or to the adjacent side wall of the vessel 15 to prevent movement of the baffle plates 42 and 43 while the plurality of spaced discs D is rotating with the rotating shaft 17.

As illustrated in FIG. 2, the plurality of compartments 40 is divided into a plurality of first inlet compartments 40a and a plurality of second outlet compartments 40b for a purpose to be explained hereinafter. A plurality of openings 50 is formed in the side wall of the vessel 15 adjacent each of the compartments 40 to enable the compartments 40 to communicate with a plurality of connection members 55 one of each of which is secured adjacent each of the openings 50 to extend outwardly therefrom. Each of the connection members 55 includes an attachment head 56 for connecting with suitable tubular members (FIG. 5). It is to be understood that the number of sections and compartments may vary as desired.

In FIG. 5, the apparatus A of the present invention is connected with other suitable apparatus as will be explained hereinbelow for forming a rotating bed absorber system to remove fluids from vapors that are removed from a well bore or the like.

A tubular member removes the vapors from the well bore (not shown) in the direction of the arrow 60 through the tubular member 61. The tubular member 61 extends upwardly and a plurality of tubular members 62 is connected therewith in any suitable manner to extend outwardly therefrom for connection with the heads 56 of the tubular members 55 which communicate with the first compartment 40a such that the vapors are moving in the direction of the arrow 63. The vapors continuously enter the compartments 40a and communicate only with the first section 45 of each of the compartments 40a since the baffles 42 and 43 prevent communication each of the vapors with the sections 46 and 47 of each of the first compartments 40a.

The openings or holes in each of the pairs of cover plates connected with each of the plurality of discs D permit vapors to flow through each of the adjacent discs D and the desiccant positioned in the compartment 35 so that the desiccant absorbs the fluids in the vapors. It is, of course, to be understood that the discs D are continuously rotated while the vapors are injected or communicated into each of the sections 45 of the first compartments 40a.

As illustrated in FIG. 2, the vapors enter the first compartments 40a and each of the first sections 45 and through each adjacent disc D such as illustrated by the arrows 63a and 63b. The dried vapor, after passing through the desiccant enters into the adjacent second compartments 40b and each corresponding first section 45 to enter a circulation tubular member 64 (FIG. 5). The vapors at this step are dry since they have been passed through the desiccant and as illustrated by the arrow 65, the gas vapors leave each of the first sections 45 of the second compartments 40b through the connected tubular members 55 which are secured with a plurality of tubular members 64a. The members 64a are in turn secured with the circulation tubular member 64.

The dry vapor is then passed through a cooler C which lowers the temperature of the vapor to thereafter move in the direction of the arrow 70 through the circulation member 64.

A plurality of tubular members 71 is mounted with the circulation tubular member 64 (FIG. 5) and extend inwardly adjacent the rotating bed absorber to be secured with the tubular members 55 which extend outwardly from each of the openings 50 in the vessel 15 of each of the sections 47 of the first compartments 40a such that the gas is moved in the direction of the arrows 72. The gas enters each of the sections 47 of each of the first compartments 40a and passes through each of the adjacent discs D and the compartments 35 as explained hereinabove into the adjacent similar sections 47 in each of the second compartments 40b. The cooled dry vapor passes through the desiccant; the desiccant is cooled which increases its absorption efficiency. The dry vapor then enters each of the tubular members 55 communicating with each of the sections 47 in each of the second compartments 40b and moves in the direction of the arrow 75. One of each of the tubular member 55 and the respective heads 56 extending outwardly from sections 47 of the compartment 40b is secured with one of each of a plurality of tubular sections 76, each of which is secured at its other end to a tubular member 80 to thereby return the dry vapor to a main pipeline or any other suitable place of storage as illustrated by the arrow 82.

As the discs D are rotated and the vapor is passed through each of the discs D from each of the sections 45 of the first compartments into similar sections 45 in adjacent second compartments 40b, the desiccant absorbs quantities of fluids to dry the vapor as brought out hereinabove. The desiccant becomes saturated and loses its efficiency if it is not dried by steam, hot air, gas, or other suitable means to remove fluids therefrom.

Thus, as illustrated in FIG. 5, a boiler 90 is provided for heating water and thereby producing steam to move the steam in the direction of the arrow 91 into the tubular member 92. A plurality of tubular sections 93 is secured with the tubular member 92 and each extends inwardly to be secured with the adjacent tubular members 55 which communicate with the openings 50 in each section 46 of the first compartments 40a. The steam 91 is continuously moved in the direction of the arrows 95 into each of the sections 46 of each of the first compartments 40a. The steam in each of the sections 46 is prevented from communicating with the other sections 45 and 47 of each of the first compartments 40a by the baffles 42 and 43 such that the steam passes through the openings or holes of the cover plates 29 of the discs D adjacent each of the first compartments 40a to steam and dry the desiccant in the compartments 35 by removing the fluids from the absorbed desiccant. This enables the desiccant to be continually dried and also enables the fluids to be continuously removed from the rotating bed absorber.

The fluids and steam flow through the adjacent discs D and each of the adjacent compartments 35 into each adjacent similar section 46 in each of the adjacent second compartments 40b. The fluids then flow in the direction of the arrow 100 outwardly from the second compartment 40b and through their respective tubular members 55 into a plurality of correspondingly connected tubular sections 105. The tubular sections 105 are secured with a tubular member 106 for enabling the fluids to flow in the direction of the arrow 107 into a suitable condenser 108 which condenses the steam and fluid or any remaining steam into fluid.

These unseparated fluids flow in the direction of the arrow 109 through a suitable tubular member (not numbered) into an oil separator 110 which separates oil from the water. The oil flows outwardly through a tubular member 111 to a suitable oil storage as desired.

The water separated from the oil is partially maintained in any suitable storage facility or drained into the tubular member 112 with the remainder of the water flowing through a tubular member 115 back into the boiler 90 for recirculation as steam through the plurality of sections 46 of each of the first and second compartments 40a and 40b for continuous drying of the desiccant positioned in the desiccant compartment 35 of each of the rotating discs D.

In the foregoing description of the rotating bed absorber in a system for use with a well bore, it is to be understood that the inlet pressure for the steam and the like, the inlet pressure for the wet and dry gas are the same to prevent the wet and dry gas and steam from mixing. Also, the pressures in each outlet stream are the same to prevent mixing.

Further, since the desiccant is continuously dried for removal of fluids and since the desiccant is continuously cooled and vapors passed therethrough for absorption of fluids, the dew point temperature of the removed dry vapor remains substantially constant and the efficiency of the desiccant as an absorber remains constant.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:

1. In a rotating bed absorber for removing fluids from vapors the improvement comprising:
   (a) a hollow vessel;
   (b) a shaft positioned in said vessel and extending outwardly therefrom;
   (c) motor means mounted with said shaft for rotating said shaft;
   (d) a plurality of spaced discs mounted transversely with said shaft and positioned in said hollow vessel wherein each of said discs is rotated as said motor means rotates said shaft;
   (e) each of said discs having a plurality of openings on each side thereof;
   (f) a desiccant positioned in each of said rotating discs for absorbing fluids from vapors;
   (g) a plurality of spaced first baffle plates positioned parallel to said shaft and mounted with said vessel, one of each of said first baffle plates being positioned between said spaced discs wherein said hollow vessel is divided into a plurality of first and second sections;
   (h) a plurality of spaced second baffle plates positioned in said second section, one of each of said second baffle plates being positioned between said spaced discs wherein a plurality of third sections is formed on the same side as said second sections and wherein said openings in said discs enable vapors to communicate with adjacent sections;
   (i) a plurality of openings in said hollow vessel, one of each of said openings communicating with one of each of said sections formed by said plurality of first and second baffle plates;
   (j) a first tubular member connected to alternate openings communicating with alternate sections of said first sections for inserting the vapor in said alternate first sections of said vessel wherein the vapors pass through said openings in said rotating discs containing said desiccant into the remainder of said first sections and wherein the fluids in the vapors are absorbed by the desiccant to thereby dry the vapor;
   (k) a tubular circulation member connected at one end with the remainder of said openings communicating with the remainder of said first sections;
   (l) said tubular circulation member connected at the other end with alternate openings communicating with alternate sections of said third sections wherein dry vapor from the remainder of said first sections enters the alternate of said third sections and passes through said adjacent rotating discs and the desiccant positioned therein for cooling of the desiccant;
   (m) a second tubular member connected with the remainder of said openings communicating with the remainder of said third sections for removal of dry gas;
   (n) a tubular member connected to alternate openings communicating with alternate sections of said plurality of second sections for inserting a drier in alternate sections of said second sections wherein the drier passes through adjacent rotating discs and said desiccant positioned therein to continuously dry said desiccant by removing the absorbed fluids and wherein the fluids flow into the remainder of said second sections; and
   (o) a tubular member connected with the remainder of said openings communicating with the remainder of said second sections for continuous removal of the fluids from said rotating bed absorber.

2. The structure as set forth in claim 1 wherein the pressure in each of the sections is the same.

3. In a rotating absorber for removing fluids from vapors passing therethrough the improvement comprising:
   (a) a hollow vessel;
   (b) a rotatable shaft positioned in said vessel;
   (c) a plurality of spaced discs mounted with said rotatable shaft in said vessel, said discs dividing said vessel into spaced compartments;
   (d) a desiccant positioned in said discs for absorption of fluids in the vapors;
   (e) means dividing each of said compartments into separate sections, so that each of said sections is prevented from communicating with other sections in said same compartments and so that similar sections in said compartments communicate through adjacent discs with adjacent similar sections in adjacent compartments;
   (f) each of said compartments being divided into a plurality of first compartments and second compartments;
   (g) means for communicating a drier into one of each of said sections in one of each of said first compartments so that the steam goes through said adjacent rotating discs and desiccant positioned therein to remove fluids from and to continuously dry said desiccant and so that the fluids thereafter flow into similar adjacent sections in adjacent second compartments;

(h) means for continuously removing the fluids from said similar sections in said second compartments;

(i) means for communicating the vapors into one of each of said sectons in one of each of said first compartments so that the vapors flow through the adjacent of said rotating discs to enable the desiccant to absorb the fluids in the vapors and so that the dry vapor flows into similar adjacent sections in adjacent second compartments; and (j) means for removing the dry vapor from said similar sections in said second compartment.

4. The structure as set forth in claim 3 wherein the pressure in each of said sections is the same.

5. In an apparatus for continuous removal of a portion of a mixture the improvement comprising:

(a) a hollow vessel;

(b) a rotatable shaft positioned in said vessel;

(c) a plurality of spaced discs mounted with said rotatable shaft in said vessel, said discs dividing said vessel into spaced compartments;

(d) absorbing and filtering means positioned in said disc for removal of a portion of the mixture;

(e) means dividing each of said compartments into separate sections so that each of said sections is prevented from communicating with other sections in said same compartments and so that similar sections in said compartments communicate through adjacent discs with adjacent similar sections in adjacent compartments;

(f) each of said compartments being divided into a plurality of first compartments and second compartments;

(g) means for communicating an agent into one of each of said sections in one of each of said first compartments so that the agent enters and exits said adjacent rotating dics to remove the portion of the mixture from said means positioned in said discs and to continuously regenerate said means positioned in said discs;

(h) means for removing the absorbed and filtered portion from said similar sections in said second compartments;

(i) means for communicating the mixture into one of each of said sections other than said sections receiving the agent in each of said first compartments so that the mixture moves through the adjacent of said rotating discs to enable said means positioned in said adjacent discs to remove the portion of said mixture and so that the remainder of said mixture flows into similar adjacent second compartments; and (j) means for removing the remainder of the mixture from said similar sections in said second compartments.

6. The structure as set forth in claim 5 including:

(a) means for cooling the remainder of the mixture after removal from said sections in said second compartment;

(b) means communicating said means for cooling with one of each of said sections other than said sections receiveing the agent and said sections receiving the mixture in said first compartments wherein the remainder of the mixture enters said sections in said first compartment and flows through said adjacent discs and said means positioned in said discs for maintaining a constant level of efficiency of said means positioned in said discs; and (c) the remainder of the mixture flowing into similar sections of said second compartments for removal from said apparatus.

7. The structure as set forth in claim 6 wherein the pressure in each of said sections is the same.

References Cited

UNITED STATES PATENTS

| | | | |
|---|---|---|---|
| 1,602,500 | 10/1926 | Nuss | 55—181 |
| 2,053,159 | 9/1936 | Miller | 55—179 |
| 2,080,578 | 5/1937 | Ray | 55—179 |

REUBEN FRIEDMAN, *Primary Examiner.*

C. N. HART, *Assistant Examiner.*